(12) United States Patent
Matheny et al.

(10) Patent No.: US 9,938,032 B2
(45) Date of Patent: Apr. 10, 2018

(54) MODULAR ULTRASONIC DEVICE FOR USE IN PACKAGE SEALING SYSTEMS

(71) Applicant: EDISON WELDING INSTITUTE, INC., Columbus, OH (US)

(72) Inventors: Mitch Matheny, Columbus, OH (US); Alexander B. Channell, Columbus, OH (US); Sean T. Flowers, Cincinnati, OH (US)

(73) Assignee: Edison Welding Institute, Inc., Columbus, OH (US)

( * ) Notice: Subject to any disclaimer, the term of this patent is extended or adjusted under 35 U.S.C. 154(b) by 13 days.

(21) Appl. No.: 15/343,407

(22) Filed: Nov. 4, 2016

(65) Prior Publication Data

US 2017/0297754 A1 Oct. 19, 2017

Related U.S. Application Data

(60) Provisional application No. 62/324,061, filed on Apr. 18, 2016.

(51) Int. Cl.
| | | |
|---|---|---|
| B32B 37/00 | (2006.01) |
| B65B 51/22 | (2006.01) |
| B65B 9/20 | (2012.01) |
| B65B 51/30 | (2006.01) |

(52) U.S. Cl.
CPC .............. B65B 51/225 (2013.01); B65B 9/20 (2013.01); B65B 51/30 (2013.01)

(58) Field of Classification Search
CPC ......... B65B 51/225; B65B 9/20; B65B 51/30; B29C 65/08; B06B 1/06; B06B 3/00

USPC ................... 156/73.1, 580.1, 580.2
See application file for complete search history.

(56) References Cited

U.S. PATENT DOCUMENTS

| | | | |
|---|---|---|---|
| 4,517,790 A | 5/1985 | Kreager | |
| 4,534,818 A | 8/1985 | Kreager et al. | |
| 5,575,884 A | 11/1996 | Annehed et al. | |
| 6,110,089 A | 8/2000 | Hatozaki et al. | |
| 6,605,178 B1 * | 8/2003 | Shinohara | ............... B29C 65/08 |
| | | | 156/379.6 |
| 7,802,604 B2 * | 9/2010 | Martin | ..................... B06B 3/00 |
| | | | 156/580.1 |
| 7,810,699 B1 | 10/2010 | Cai et al. | |
| 7,887,656 B2 | 2/2011 | Yamamoto | |
| 8,366,855 B2 | 2/2013 | Murray | |
| 8,539,741 B2 | 9/2013 | Lubezny et al. | |
| 8,591,679 B1 | 11/2013 | Hull | |
| 8,621,827 B2 | 1/2014 | Volger et al. | |
| 8,689,850 B2 | 4/2014 | Hull | |

(Continued)

FOREIGN PATENT DOCUMENTS

| | | |
|---|---|---|
| WO | 2011117119 A1 | 9/2011 |
| WO | 2014022798 A2 | 2/2014 |

(Continued)

*Primary Examiner* — James Sells
(74) *Attorney, Agent, or Firm* — Frost Brown Todd LLC

(57) ABSTRACT

An ultrasonic module for use in package sealing systems that includes a moveable front jaw; an elongated sonotrode disposed within the front jaw, wherein the sonotrode includes an elongated sealing face, and wherein the width of the sealing face is at least 12 inches (30.48 cm); a moveable rear jaw; and an anvil mounted on the rear jaw opposite the sonotrode, wherein the anvil mechanically cooperates with the sonotrode to seal a package.

20 Claims, 3 Drawing Sheets

(56) References Cited

U.S. PATENT DOCUMENTS

| | | |
|---|---|---|
| 8,720,168 B2 | 5/2014 | Kamigaito et al. |
| 9,003,749 B2 | 4/2015 | Kamigaito |
| 9,079,361 B2 | 7/2015 | Ippers et al. |
| 9,090,021 B2 | 7/2015 | Cham et al. |
| 9,149,980 B2 | 10/2015 | Cham et al. |
| 9,205,596 B2 | 12/2015 | Short |
| 9,221,077 B2 | 12/2015 | Chen et al. |
| 2003/0209307 A1* | 11/2003 | Gartland ................ B29C 65/08 156/73.1 |
| 2005/0229550 A1 | 10/2005 | Eder |
| 2005/0271306 A1 | 12/2005 | Murray |
| 2007/0017623 A1 | 1/2007 | Wild et al. |
| 2007/0110344 A1 | 5/2007 | Murray |
| 2007/0211967 A1 | 9/2007 | Murray |
| 2007/0262100 A1 | 11/2007 | Murray |
| 2010/0262273 A1 | 10/2010 | Dose et al. |
| 2011/0192117 A1 | 8/2011 | Lubezny et al. |
| 2012/0178604 A1 | 7/2012 | Ippers et al. |
| 2012/0285127 A1 | 11/2012 | Kamigaito |
| 2013/0228288 A1 | 9/2013 | Ippers et al. |
| 2013/0240153 A1 | 9/2013 | Hull |
| 2013/0292277 A1 | 11/2013 | Hull |
| 2015/0107780 A1 | 4/2015 | Hull |
| 2015/0107781 A1 | 4/2015 | Hull |
| 2015/0274337 A1 | 10/2015 | Beauvy et al. |
| 2016/0001499 A1 | 1/2016 | Cham et al. |
| 2016/0101437 A1 | 4/2016 | Chen et al. |
| 2016/0250773 A1 | 9/2016 | Lee et al. |

FOREIGN PATENT DOCUMENTS

| | | |
|---|---|---|
| WO | 2014022801 A2 | 2/2014 |
| WO | 2015116587 A1 | 8/2015 |

* cited by examiner

MODULAR ULTRASONIC DEVICE FOR USE IN PACKAGE SEALING SYSTEMS

CROSS-REFERENCE TO RELATED APPLICATIONS

This patent application claims the benefit of U.S. Provisional Patent Application Ser. No. 62/324,061 filed on Apr. 18, 2016 and entitled "Modular Ultrasonic Device for Use in Package Sealing Systems", the disclosure of which is hereby incorporated by reference herein in its entirety and made part of the present U.S. utility patent application for all purposes.

BACKGROUND OF THE INVENTION

The described invention relates in general to systems, devices, and methods for sealing bags and containers used with consumer packaged goods, and more specifically to ultrasonic systems, modular devices, and methods for manufacturing and/or assembling the packages used to contain food and other items.

The consumer packaged goods industry typically utilizes thin film materials coated with a thermally activated sealant layer, in combination with resistively heated thermal jaw systems, for sealing packages used to contain various food products. Thermal sealing technology is commonly used on packages that are between 2-12 inches in width and to maintain acceptable seal integrity for perishable products, the thermal seal region is oversized to reduce gas leak rates. However, these large thermal seal areas are known to still experience high rates of gas leakage. Large thermal seal areas also result in higher material costs and the high gas leak rate results in shorter shelf life for the products contained in this type of package. Additionally, currently used thermal sealing systems and methods are not capable of effectively sealing through even a minimal amount of food or other product that has entered the seal region of a package. This problem leads to higher factory scrap and an increased likelihood of delivering spoiled or unusable product to the consumer.

Previous attempts have been made to introduce ultrasonic sealing technology to consumer packaged goods with little or no adoption thereof by the industry. Current ultrasonic sealing technology does not provide a solution that can be used in mass production to seal thin or thick films having widths of over 12 inches. Ultrasonic sealing methods are available which allow for sealing limited package widths (e.g., up to 8 inches) using a single transducer, while sealing greater widths may be accomplished only by using multiple transducer systems. Most users of sealing systems require the flexibility to make seal widths between 2 and 12 inches (or greater) on a single machine without requiring tooling changes. Thus, there is an ongoing need for a package sealing technology that effectively creates non-leaking seals of greater widths while reducing the overall area of the seal to provide material saving and cost savings.

SUMMARY OF THE INVENTION

The following provides a summary of certain exemplary embodiments of the present invention. This summary is not an extensive overview and is not intended to identify key or critical aspects or elements of the present invention or to delineate its scope.

In accordance with one aspect of the present invention, a system for use in sealing packages is provided. The system includes a system for use in sealing packages, wherein the system includes an ultrasonic sealing module that further includes a moveable front jaw; an elognated sonotrode disposed within the front jaw, wherein the sonotrode includes an elongated sealing face, and wherein the width of the sealing face is at least 12 inches (30.48 cm); a moveable rear jaw; and an anvil mounted on the rear jaw opposite the sonotrode, wherein the anvil mechanically cooperates with the sonotrode to seal a package; and a package sealing machine upon which the ultrasonic sealing module is mounted.

In accordance with another aspect of the present invention, a first ultrasonic module for use in package sealing systems is provided. This ultrasonic module includes a moveable front jaw; an elognated sonotrode disposed within the front jaw, wherein the sonotrode includes an elongated sealing face, and wherein the width of the sealing face is at least 12 inches (30.48 cm); a moveable rear jaw; and an anvil mounted on the rear jaw opposite the sonotrode, wherein the anvil mechanically cooperates with the sonotrode to seal a package.

In yet another aspect of this invention, a second ultrasonic module for use in package sealing systems is provided. This ultrasonic sealing module includes a moveable front jaw; an elognated sonotrode disposed within the front jaw, wherein the sonotrode includes an elongated sealing face, and wherein the width of the sealing face is at least 12 inches (30.48 cm); a moveable rear jaw; an anvil mounted on the rear jaw opposite the sonotrode, wherein the anvil mechanically cooperates with the sonotrode to seal a package; a single ultrasonic transducer, wherein the single ultrasonic transducer provides a predetermined amount ultrasonic energy to the sonotrode; and first and second guide shafts connected to the front jaw upon which the rear jaw is slidably mounted.

Additional features and aspects of the present invention will become apparent to those of ordinary skill in the art upon reading and understanding the following detailed description of the exemplary embodiments. As will be appreciated by the skilled artisan, further embodiments of the invention are possible without departing from the scope and spirit of the invention. Accordingly, the drawings and associated descriptions are to be regarded as illustrative and not restrictive in nature.

BRIEF DESCRIPTION OF THE DRAWINGS

The accompanying drawings, which are incorporated into and form a part of the specification, schematically illustrate one or more exemplary embodiments of the invention and, together with the general description given above and detailed description given below, serve to explain the principles of the invention, and wherein.

DETAILED DESCRIPTION OF THE INVENTION

Figure 1:
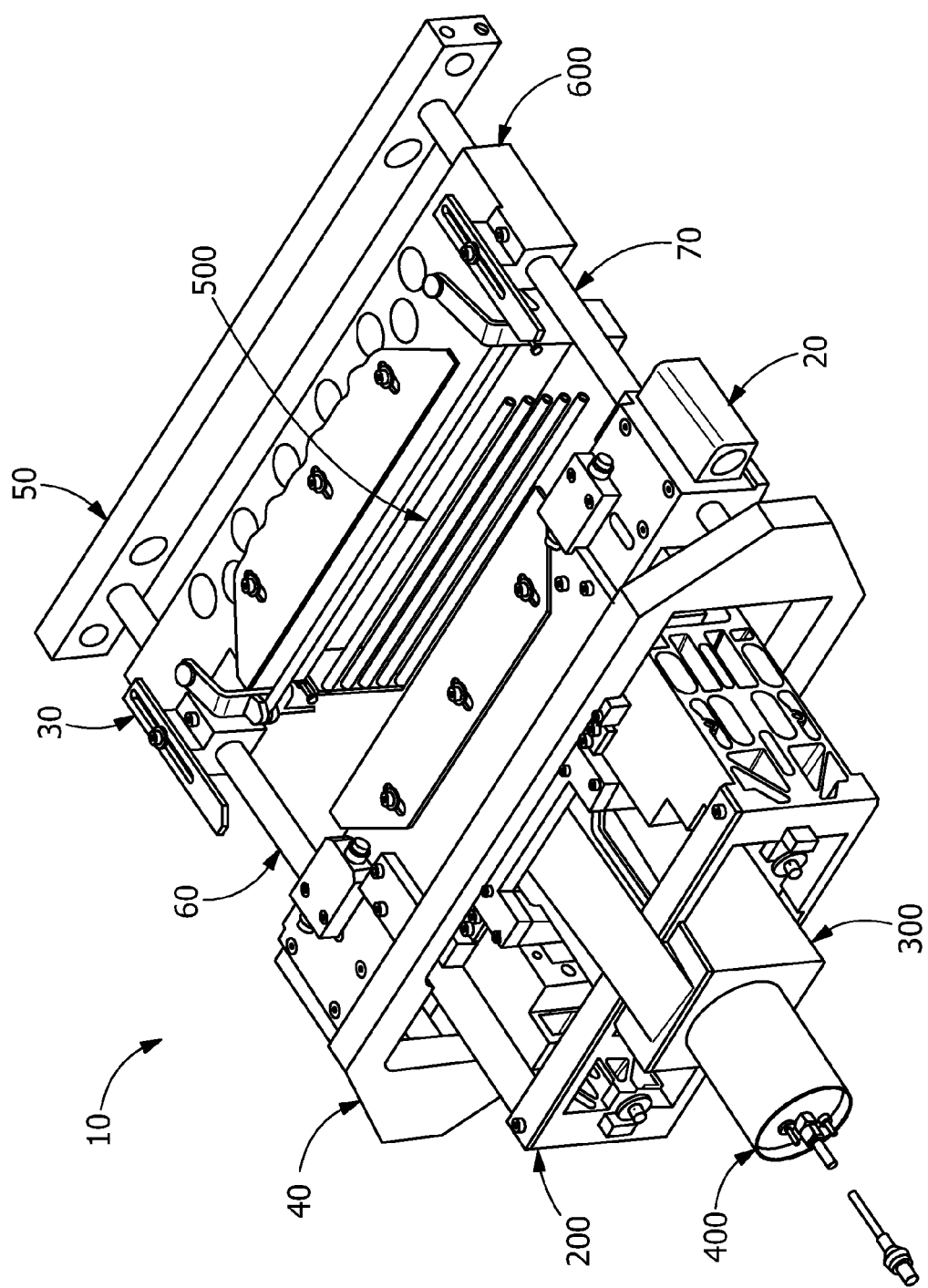
FIG. 1 is a perspective view of an ultrasonic sealing module in accordance with an exemplary embodiment of the present invention.

Exemplary embodiments of the present invention are now described with reference to the Figures. Reference numerals are used throughout the detailed description to refer to the various elements and structures. Although the following detailed description contains many specifics for the purposes of illustration, a person of ordinary skill in the art will appreciate that many variations and alterations to the following details are within the scope of the invention. Accordingly, the following embodiments of the invention are set forth without any loss of generality to, and without imposing limitations upon, the claimed invention.

The present invention relates generally to systems, devices, and methods for sealing packages and the like, and more specifically to a modular device or apparatus for use in the ultrasonic sealing of packages, wherein seals of greater width (compared to prior art systems and devices) may be created while reducing the overall surface area of the seal and reducing gas leakage. When compared to thermal seals, ultrasonic seals meet or exceed the strength thereof and provide reduced gas leakage rates at significantly reduced seal sizes. Reducing seal size permits reduction of the overall package size, which results in the reduction of materials costs. Reducing the gas leak rate improves and extends the shelf life of perishable products. The present invention provides a modular ultrasonic bag sealing apparatus or device that may be used with various existing bag sealing systems and with newly designed bag sealing systems.

Figure 2:
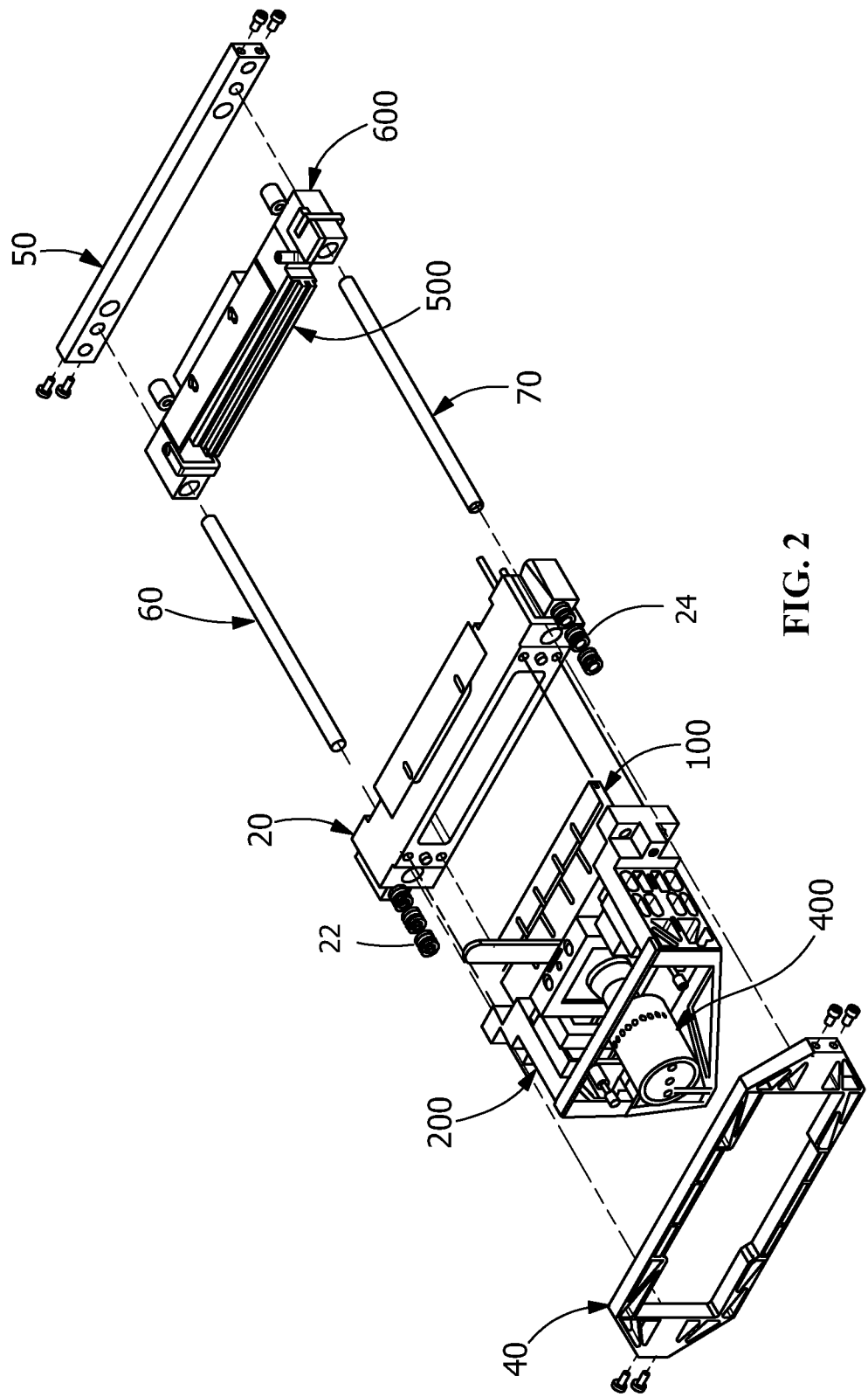
FIG. 2 is an exploded perspective view of the ultrasonic sealing module of FIG. 1.
Figure 3:
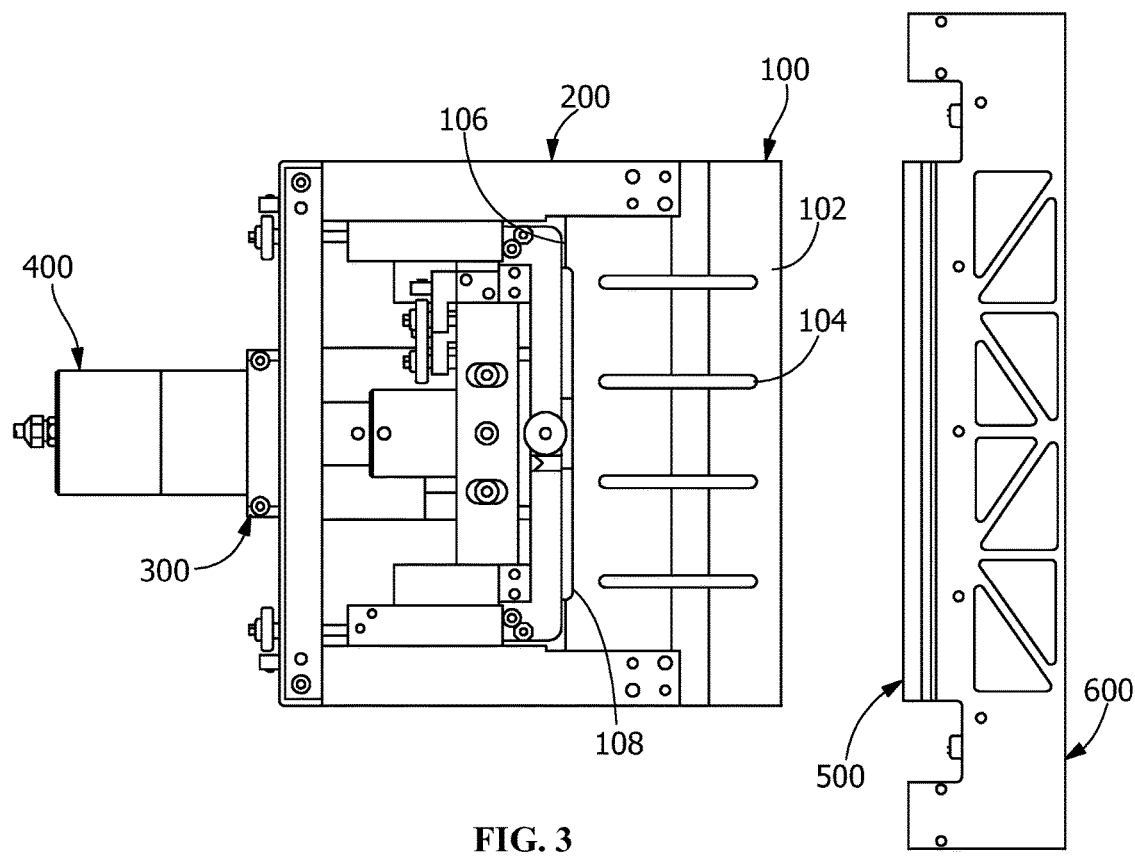
FIG. 3 is a top view of the modular ultrasonic package sealing device of FIG. 1.
Figure 4:
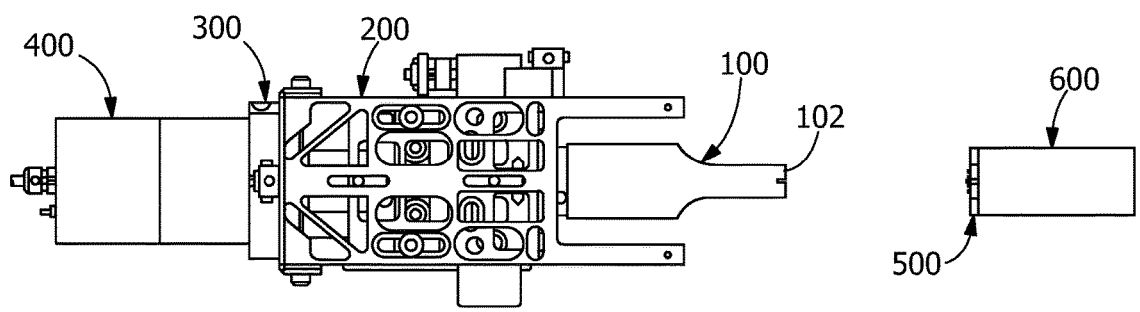
FIG. 4 is a side view of the modular ultrasonic package sealing device of FIG. 1.

FIGS. 1-4 provide illustrations of an ultrasonic sealing module in accordance with an exemplary embodiment of the present invention. This device is intended for use in mass-production environments, but may be used in other environments, and is capable of sealing of a broad range of film thicknesses and widths. The device or apparatus depicted in the Figures, may be retrofitted to commonly-used thermal sealing reciprocal bag makers or may be incorporated into new bag maker builds. The present invention is intended for vertical or horizontal form fill seal equipment (VFFS or HFFS), but could be applied to or adapted for use with virtually any type of packaging equipment. The modular aspect of this invention allows it to be connected to the existing end seal mechanical motion system of a commercially available bag making system. Mechanical self-leveling features included in ultrasonic sealing module of this invention permit the module to be adjusted as necessary following installation. In exemplary embodiments, the invention utilizes commercial off the shelf ultrasonic components including a power supply, transducer, and booster. The ultrasonic sealing module of this invention also includes a sonotrode, uniquely designed anvil, and mechanical support system. The horn of ultrasonic sonotrode can be 12 inches (30.48 cm) in width (or greater) and is energized by a single ultrasonic transducer, which facilitates sealing packages of various sizes (e.g., 6-inch, 8-inch, and 12-inch) without requiring a tooling change. Much wider seams can be created with this invention as compared to prior art systems and devices.

Again with reference to the Figures, FIGS. 1-4 provide various alternate views of exemplary ultrasonic sealing module 10, which includes first sealing member or "front jaw" 20 and a second sealing member or "rear jaw" 30; front mounting plate 40; rear mounting plate 50; first guide shaft 60; and second guide shaft 70. Exemplary ultrasonic horn or sonotrode 100 includes elongated sealing face 102. Sonotrode 100 is secured within mounting frame 200, upon which stack mount 300 and ultrasonic transducer 400 are also mounted. Ultrasonic transducer 400 provides a predetermined amount of ultrasonic energy to sonotrode 100 when ultrasonic sealing module 10 is in operation. Rear jaw 30 includes anvil 500, which is mounted on frame 600, which in turn is slidably mounted on first guide shaft 60 and second guide shaft 70. Sonotrode 100 is disposed within front jaw 20, which cooperates with anvil 500 on rear jaw 30 to seal packages when ultrasonic sealing module 10 is in operation.

The modular ultrasonic package sealing device of this invention is capable of producing ultrasonic seals below 2 inches in width and over 12 inches in width with no required tooling changes. A change in package width or material thickness does not require a tool change. This invention can seal packages which include the thin films commonly used in the snack package industry as well as thicker films used to package consumer products or foods such as produce, poultry, or dairy. The ultrasonic seals created with this invention are smaller in size than thermal seals, which permits a reduction in the required amount of packaging material. The ultrasonic sealing process of this invention also provides an improvement in sealing through minimal snack product (e.g., chips, salt, grease, etc.), which reduces in process scrap at the factory, and prevents or reduces the likelihood of spoiled or bad product from reaching the consumer. The improved ability to seal through snack product also allows for a reduction in package headspace, which further reduces overall material use. The ultrasonic seals created with this invention have been tested in mass-production environments (e.g., millions of packages sealed) and proven to have a lower gas (e.g., oxygen) leak rate when compared to traditional thermal seals. A lower gas transfer rate results in a longer product shelf life.

Other advantages of the present invention include a modular mechanical structure that supports the ultrasonic jaws of the device. This aspect facilitates retrofitting existing bag maker equipment or incorporation into new bag maker builds and provides a mechanical structure that attaches to an existing bag maker motion system so no ancillary motors or other motion devices are required. This invention provides: (i) a system that can seal thin films at high volume production rates without damage to ultrasonic components; (ii) a dual force system that includes biasing members and/or assemblies such as spring assemblies or pneumatic assemblies 22 and 24 (see FIG. 2) that provides minor compensation for self-leveling; and (iii) mechanical alignment features that allow the sonotrode and anvil weld faces to be parallel to one another other. This arrangement permits the very fine adjustments involved in leveling the sonotrode and anvil sealing faces used for thin film sealing, across a wide sealing face.

A further advantage of the present invention is its usefulness in the packaging of products that include chocolate or similar substances. Current packaging systems and methodologies used with products of this nature utilize a "cold seal" approach, wherein a pressure sensitive adhesive, similar to rubber cement, is applied to the sealing surfaces of the package and then pressed together. Because the ultrasonic sealing technology used with the present invention does not generate high heat in the sealing area, it can be used to replace cold seals in product packages that contain chocolate, thereby significantly reducing the cost of the package. As with other applications of this invention, the seal area can also be reduced, thereby contributing to reduced packaging material and material costs.

While the present invention has been illustrated by the description of exemplary embodiments thereof, and while the embodiments have been described in certain detail, it is not the intention to restrict or in any way limit the scope of the appended claims to such detail. Additional advantages and modifications will readily appear to those skilled in the art. Therefore, the invention in its broader aspects is not limited to any of the specific details, representative devices and methods, and/or illustrative examples shown and described. Accordingly, departures may be made from such details without departing from the spirit or scope of the general inventive concept.

What is claimed:

1. A system for use in sealing packages comprising;
   (a) an ultrasonic sealing module, wherein the ultrasonic sealing module includes:
      (i) a moveable front jaw;
      (ii) an elognated sonotrode disposed within the front jaw, wherein the sonotrode includes an elongated sealing face, and wherein the width of the sealing face is at least 12 inches (30.48 cm);
      (iii) a moveable rear jaw; and
      (iv) an anvil mounted on the rear jaw opposite the sonotrode, wherein the anvil mechanically cooperates with the sonotrode to seal a package; and
   (b) a package sealing machine upon which the ultrasonic sealing module is mounted.

2. The system of claim 1, further including a single ultrasonic transducer, wherein the single ultrasonic transducer provides a predetermined amount of ultrasonic energy to the sonotrode.

3. The system of claim 1, further including first and second guide shafts connected to the front jaw upon which the rear jaw is slidably mounted.

4. The system of claim 1, further including a supportive frame on which the front jaw and the sonotrode are slidably mounted.

5. The system of claim 4, further including a dual force system for providing self-leveling characteristics to the ultrasonic sealing module, wherein the dual force system includes first and second biasing assemblies disposed between the front jaw and supportive frame on either side of the sonotrode.

6. The system of claim 1, wherein the package sealing machine is a vertical form fill sealing machine.

7. The system of claim 1, wherein the package sealing machine is a horizontal form fill sealing machine.

8. An ultrasonic module for use in package sealing systems, comprising:
   (a) a moveable front jaw;
   (b) an elognated sonotrode disposed within the front jaw, wherein the sonotrode includes an elongated sealing face, and wherein the width of the sealing face is at least 12 inches (30.48 cm);
   (c) a moveable rear jaw; and
   (d) an anvil mounted on the rear jaw opposite the sonotrode, wherein the anvil mechanically cooperates with the sonotrode to seal a package.

9. The module of claim 8, further including a single ultrasonic transducer, wherein the single ultrasonic transducer provides a predetermined amount of ultrasonic energy to the sonotrode.

10. The module of claim 8, further including first and second guide shafts connected to the front jaw upon which the rear jaw is slidably mounted.

11. The module of claim 8, further including a supportive frame on which the front jaw and the sonotrode are slidably mounted.

12. The module of claim 9, further including a dual force system for providing self-leveling characteristics to the ultrasonic sealing module, wherein the dual force system includes first and second biasing assemblies disposed between the front jaw and supportive frame on either side of the sonotrode.

13. The module of claim 8, wherein the module is adapted for use in a package sealing machine, and wherein the package sealing machine is a vertical form fill sealing machine or a horizontal form fill sealing machine.

14. An ultrasonic module for use in package sealing systems, comprising:
   (a) a moveable front jaw;
   (b) an elognated sonotrode disposed within the front jaw, wherein the sonotrode includes an elongated sealing face, and wherein the width of the sealing face is at least 12 inches (30.48 cm);
   (c) a moveable rear jaw;
   (d) an anvil mounted on the rear jaw opposite the sonotrode, wherein the anvil mechanically cooperates with the sonotrode to seal a package;
   (e) a single ultrasonic transducer, wherein the single ultrasonic transducer provides a predetermined amount of ultrasonic energy to the sonotrode; and
   (f) first and second guide shafts connected to the front jaw upon which the rear jaw is slidably mounted.

15. The module of claim 14, further including a supportive frame on which the front jaw and the sonotrode are slidably mounted.

16. The module of claim 15, further including a dual force system for providing self-leveling characteristics to the ultrasonic sealing module, wherein the dual force system includes first and second biasing assemblies disposed between the front jaw and supportive frame on either side of the sonotrode.

17. The module of claim 14, wherein the module is adapted for use in a package sealing machine.

18. The module of claim 17, wherein the package sealing machine is a vertical form fill sealing machine.

19. The module of claim 17, wherein the package sealing machine is a horizontal form fill sealing machine.

20. The module of claim 17, wherein the package sealing machine is adapted for use with thin film materials.

* * * * *